Feb. 18, 1941.   J. V. NEVIN   2,232,075
PLYWOOD SIDING
Filed Feb. 12, 1938   2 Sheets-Sheet 1
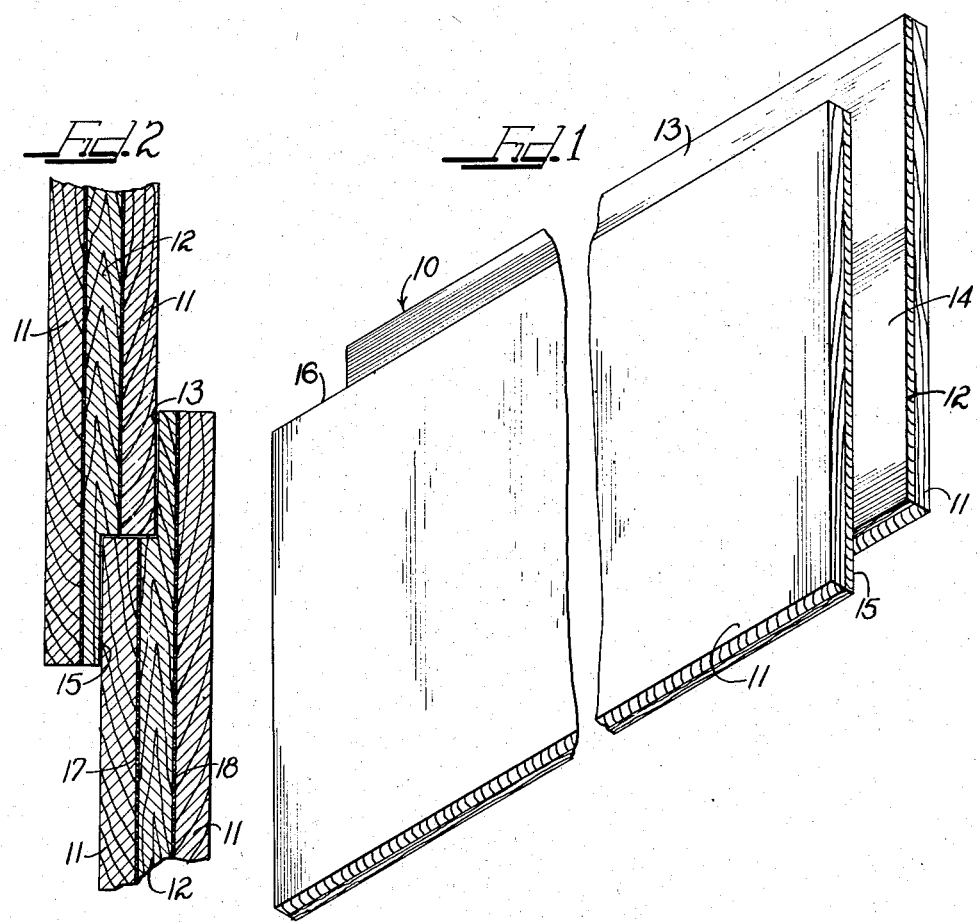
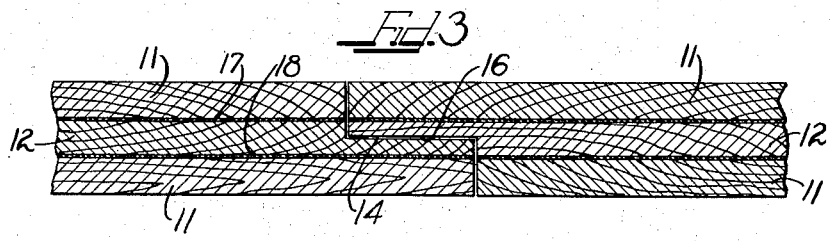
Inventor
JAMES V. NEVIN

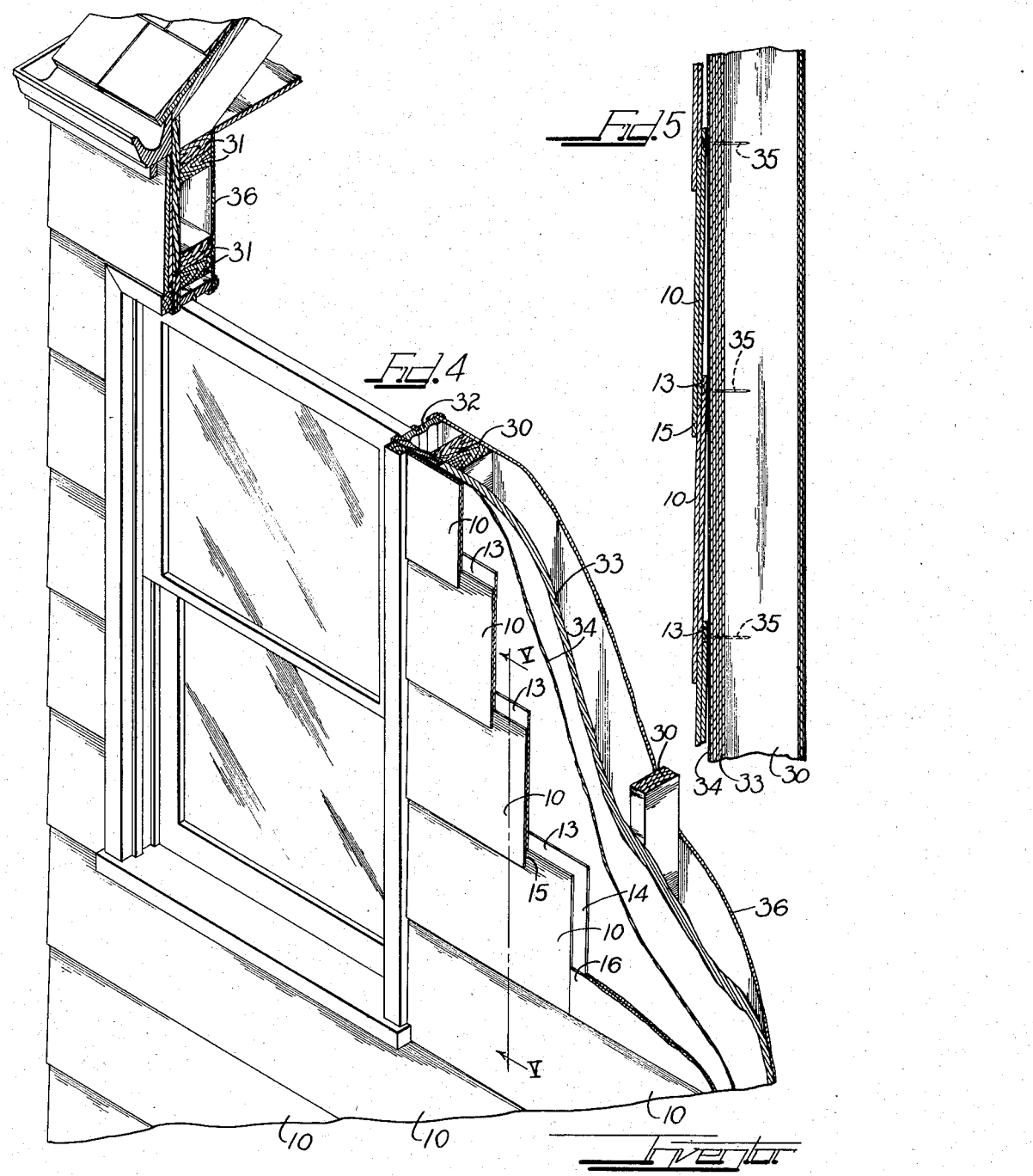

Patented Feb. 18, 1941

2,232,075

UNITED STATES PATENT OFFICE 2,232,075

PLYWOOD SIDING

James V. Nevin, Aberdeen, Wash.

Application February 12, 1938, Serial No. 190,186

2 Claims. (Cl. 20—5)

This invention relates to the manufacture of siding or lapboard from plywood.

More specifically, the invention relates to plywood siding board, double rabbeted at the sides and ends thereof, and composed of wood plies permanently united with a thermosetting resinous bonding agent.

Siding or lapboard has heretofore been prepared by channeling the side or sides of clear, first grade lumber. The ends of the lumber boards have not been channeled.

According to this invention, plywood panels composed of wood veneer sheets permanently united by means of a thermoplastic synthetic resinous bonding agent are used in place of lumber boards to form sidings or lapboards. These plywood panels can be made in any size, whereas the heretofore used lumber boards are necessarily limited in size due to limitations in tree diameter and saw mill cutting practice. Plywood siding boards from 8" to 48" in width and from 12" to 96" in length are commercially practical according to this invention.

Veneer sheets cut or peeled from cedar, redwood, fir, spruce, or pine are laminated together with a thermo-setting resinous condensation product in a platen press under heat and pressure. The veneer sheets are arranged in the panels so that the grains of adjacent sheets run at right angles to each other.

In preparing the plywood for use in making siding or lapboard according to this invention, a thermo-setting resinous bonding agent is used that sets to produce a bond between the veneers that is weatherproof, verminproof, and fire-resistant.

As the thermo-setting binder, it is desirable to use an aqueous solution of a partially condensed cresylic acid-aldehyde resin. Cresylic acid or commercial cresol is mixed with an aqueous solution of formaldehyde. These ingredients are reacted exothermically in the presence of an alkaline catalyst, such as sodium hydroxide, until a water soluble partial condensation product having desirable viscosity properties is obtained. The reaction can be arrested by cooling the reaction mass or by diluting the mass with cold water. This cold water can have an additional amount of sodium hydroxide dissolved therein.

The resinous binder solution thus obtained is coated on the core veneers. The coated veneers are preferably dried to a desired moisture content and are inserted between surface veneer sheets. A superimposed stack of sheets composed of the face sheets and the coated core sheet are then mounted between the platens of a press and subjected to heat and pressure for setting the resin to unite or weld the sheets together for forming an integral plywood panel.

The thus obtained plywood panels are cut into board sizes as desired and are rabbeted or channeled at the sides and ends thereof by means of a routing machine for forming the lapping edges or tabs of the usual siding.

It is then an object of this invention to provide plywood siding for building constructions.

Another object of this invention is to provide lapboard composed entirely of plywood.

A further object of this invention is to provide verminproof, waterproof, and fire-resistant siding or lapboard for building constructions.

Another object of this invention is to provide a weatherproof siding lumber composed of veneer sheets permanently united together with a resinous bonding agent.

Other and further objects of this invention will become apparent to those skilled in the art from the following detailed description of the annexed sheets of drawings which disclose a preferred embodiment of the invention.

On the drawings:

Figure 1 is a broken perspective view of a siding board or lapboard according to this invention.

Figure 2 is an enlarged vertical cross sectional view taken through two adjacent lapboards of this invention mounted in overlapping relation to provide the usual lap joint or broken front.

Figure 3 is an enlarged horizontal cross sectional view taken through two adjacent lapboards according to this invention having their ends mounted to provide a flush joint.

Figure 4 is a fragmentary perspective view, with parts broken away and shown in cross section, of a corner of a building illustrating the use of the siding shown in Figures 1 to 3.

Figure 5 is a vertical cross sectional view taken along the line V—V of Figure 4.

As shown on the drawings:

In Figure 1 the reference numeral 10 designates generally a siding board or lapboard according to this invention. This siding board is composed of three-ply wood having surface veneers or plies 11 and a core veneer or ply 12 between the surface veneers.

The lapboard 10 is rabbeted or channeled along the sides and ends thereof to form marginal edges or half lap tabs 13, 14, 15, and 16 around the perimeter of the board. The marginal edges 13 and 15 extend longitudinally of the board 10, while the marginal edges 14 and 16 extend across the ends of the board 10.

These marginal edges are formed by cutting away one side and one end portion of one of the face veneer sheets forming the board and half of the thickness of the core sheet. This will form marginal edges such as 13 and 14, for example. The other veneer sheet is then cut away along one side and one end thereof. This cut likewise extends halfway through the thickness of the core sheet to form the marginal edges such as 15 and 16.

The marginal edges 13 to 16 inclusive, therefore, have faces defined by the core sheet 12.

As shown in Figures 2 and 3, the plies 11 and 12 are integrally united together by means of the two glue lines 17 and 18. These glue lines are composed of the thermally set resinous cresylic acid-formaldehyde condensation product. The bonds thus provided will not soften or in any way deteriorate under weather conditions. The glue lines serve as barriers against penetration of moisture through the boards.

As also shown in Figures 2 and 3, the core ply 12 has the grain thereof extending at right angles to the direction of the grain of the surface plies 11. This cross banding of the grain of the panels greatly strengthens the product, and siding boards of this invention are materially stronger than the highest grade lumber of the same thickness. As a result the siding boards of this invention can be made thinner than is feasible for lumber board.

The grain formations of the surface plies 11 can be made to extend transversely of the board, whereas heretofore in lumber board the grain extends along the length of the board. Thus the plywood siding of this invention can be utilized to give pleasing decorative effects not possible with ordinary lumber.

As shown in Figure 2, the margin 15 of the one lapboard overlaps a face ply 11 of the other lapboard to give the usual lap joint or broken front appearance. However, the ends of these same two boards can have a flush joint therebetween as shown in Figure 3, since the marginal ends 14 and 16 of the boards can be placed in full flush relation.

If desired, the longitudinal side margins 13 and 15 of the boards can be mounted to give a flush joint such as is shown in Figure 3.

Various architectural effects can be obtained with the lap or flush joint arrangements by bevelling or grooving the exposed edges of the boards or by the use of moulding.

In Figures 4 and 5 there is illustrated a manner in which the siding boards 10, described in Figures 1 to 3, can be used in building construction.

In the building constructions shown in Figures 4 and 5, the boards 10 are arranged so that their marginal sides or tabs overlap to give a broken front or clapboard appearance. The end tabs of the boards are flush. In these figures, the reference numerals 30 designate the usual vertical 2 x 4 studs, and the reference numerals 31 designate the usual 2 x 4 cross pieces. A window sash 32 is mounted in position in accordance with standard building practice.

According to this invention, plywood sheathing 33 is nailed to the outside edges of the studs 30 and cross pieces 31. This sheathing 33 can be covered with ordinary building paper 34 for insulation purposes.

The siding boards 10 can be nailed to the plywood sheathing 33 and studs 30 by means of nails 35 (Figure 5). These nails are driven through the marginal sides 13 and marginal ends 14 of the siding boards. Likewise, additional nails can be driven through the overlapping marginal edges of the boards.

The inner edges of the studs 30 and cross pieces 31 can have plywood panels 36 nailed thereon to present a finished interior wall for the building.

The weather surfaces of the boards present an attractive appearance both as to design and finish. The broad faces of the siding boards can be painted to present a smooth, evenly finished surface of much better quality than can be obtained by painting an ordinary lumber board. The amount of labor necessary to put in place a certain given area of siding board according to this invention is a great deal less than the amount of labor required to mount the conventional lumber siding boards. This invention eliminates the splitting and cutting, as is necessary with conventional lumber, since the plywood siding boards can be made of exact size to fit any given construction condition.

The siding boards of this invention are materially more durable than the ordinary lumber boards and, in addition, can be used in thicknesses that would be entirely impractical for lumber boards due to the increased strength of the plywoods.

I am aware that many changes may be made and numerous details of construction may be varied through a wide range without departing from the principles of this invention, and I, therefore, do not purpose limiting the patent granted hereon otherwise than necessitated by the appended claims.

I claim as my invention:

1. Weatherproof and vermin-resisting lapboard for outdoor siding in building constructions comprising a flat three-ply wood panel composed of a core veneer sheet integrally bonded on opposite broad faces thereof to a surface veneer sheet with an insoluble and infusible cresylic acid-aldehyde resin, the grain of the core sheet being at an angle to the grain of the surface sheets, said panel having a half lap tab composed of the marginal edge of one surface sheet and half the thickness of the core sheet, said tab extending flush from one broad face of the panel along one side and one end thereof, and a second half lap tab composed of the marginal edge of the other surface sheet and half the thickness of the core sheet, said tab extending flush from the other broad face of the panel along the opposite side and end thereof.

2. Weather and vermin-resisting lapboard adapted for outdoor siding comprising a flat multi-ply wood panel composed of surface plies and at least one inner ply having the grain thereof at an angle to the adjoining surface ply, said panel having the plies thereof united by a vermin-proof heat set insoluble and infusible synthetic resinous binder, a tab composed of the marginal portion of one surface ply and part of the thickness of an inner ply, said tab extending flush from one broad face of the panel along one side thereof and a second tab composed of the marginal portion of the other surface ply and part of the thickness of an inner ply, said second tab extending flush from the other broad face of the panel along the opposite side thereof, whereby the inner faces of the tabs are non-coincident with the binder lines between the plies.

JAMES V. NEVIN.